（12）United States Patent
Judd et al.

(10) Patent No.: US 7,890,262 B2
(45) Date of Patent: Feb. 15, 2011

(54) POSITION ESTIMATION FOR NAVIGATION DEVICES

(75) Inventors: Tom Judd, Carlsbad, CA (US); Bruce Graham, West Covina, CA (US); Toan Vu, Huntington Beach, CA (US)

(73) Assignee: Honeywell International Inc., Morristown, NJ (US)

( * ) Notice: Subject to any disclaimer, the term of this patent is extended or adjusted under 35 U.S.C. 154(b) by 268 days.

(21) Appl. No.: 12/059,865

(22) Filed: Mar. 31, 2008

(65) Prior Publication Data

US 2009/0248301 A1    Oct. 1, 2009

(51) Int. Cl.
*G01C 21/00*    (2006.01)
*G08G 1/123*    (2006.01)

(52) U.S. Cl. .................. 701/220; 701/221; 701/215; 701/213; 340/995.22

(58) Field of Classification Search ......... 701/200–226; 340/988–996
See application file for complete search history.

(56) References Cited

U.S. PATENT DOCUMENTS

| | | | |
|---|---|---|---|
| 4,403,291 A | 9/1983 | Von Tomkewitsch | |
| 5,706,014 A | 1/1998 | Abbasi | |
| 6,323,807 B1 | 11/2001 | Golding et al. | |
| 6,360,165 B1 | 3/2002 | Chowdhary | |
| 6,414,629 B1 | 7/2002 | Curcio | |
| 6,549,845 B2 | 4/2003 | Eakle, Jr. et al. | |
| 6,707,424 B1 | 3/2004 | Snyder et al. | |
| 6,826,477 B2 | 11/2004 | Ladetto et al. | |
| 6,859,724 B2 | 2/2005 | Komatsu | |
| 6,906,643 B2 | 6/2005 | Samadani et al. | |

2003/0179133 A1    9/2003    Pepin et al.

(Continued)

FOREIGN PATENT DOCUMENTS

GB    966197    8/1964

(Continued)

OTHER PUBLICATIONS

Bakhru, "A Seamless Tracking Solution for Indoor and Outdoor Position Location", "IEEE 16th International Symposium on Personal, Indoor and Mobile Radio Communications", Sep. 2005, pp. 2029-2033, vol. 3, Publisher: IEEE.

(Continued)

*Primary Examiner*—Jack Keith
*Assistant Examiner*—Muhammad Shafi
(74) *Attorney, Agent, or Firm*—Fogg & Powers LLC (57) ABSTRACT

A method of providing position estimation with a navigation device comprises periodically recording magnetic field strength of an area substantially surrounding a navigation device as a user of the navigation device traverses a select pathway. The method combines the recorded magnetic field strength with measurements from at least a dead reckoning portion of the navigation device to provide position estimates along the select pathway. The method further corrects each of the position estimates from a starting position on the select pathway, where each of the corrected position estimates have an error value below one or more previous position estimates and any intervening positions between each of the one or more previous position estimates and the starting position, with the error value corresponding to an error threshold based on the previous position estimates.

11 Claims, 11 Drawing Sheets

U.S. PATENT DOCUMENTS

| | | | |
|---|---|---|---|
| 2006/0247847 A1* | 11/2006 | Carter et al. | 701/200 |
| 2007/0005246 A1 | 1/2007 | Kappi | |
| 2007/0239350 A1 | 10/2007 | Zumsteg et al. | |
| 2007/0241965 A1 | 10/2007 | Kolavennu et al. | |
| 2007/0250261 A1* | 10/2007 | Soehren | 701/207 |
| 2007/0260418 A1 | 11/2007 | Ladetto et al. | |

FOREIGN PATENT DOCUMENTS

| | | |
|---|---|---|
| WO | 2007042643 | 4/2007 |
| WO | 2007079866 | 7/2007 |

OTHER PUBLICATIONS

Bevly et al., "Cascaded Kalman Filters for Accurate Estimation of Multiple Biases, Dead-Reckoning Navigation, and Full State Feedback Control of Ground Vehicles", "IEEE Transcations on Control Systems Technology", Mar. 2007, pp. 199-208, vol. 15, No. 2, Publisher: IEEE.

Jun. 2007, "DRM 4000 Dead Reckoning Module", "www.honeywell.com/magneticsensors" , , pp. 1-4, Publisher: Honeywell International Inc.

Hellstrom, "A Magnetic Compass for Indoor Localization", "Specification of Master Project", Feb. 2005, p. 1.

Iwaki et al., "Recognition of Vehicle's Location for Navigation", "Vehicle Nabigation and Information Systems Conference", Sep. 1989, pp. 131-138, Publisher: IEEE.

Jirawimut et al., "A Method for Dead Reckoning Parameter Correction in Pedestrian Navigation System", "IEEE Transactions on Instrumentation and Measurement", Feb. 2003, pp. 209-215, vol. 52, No. 1, Publisher: IEEE.

Kacemi et al., "Information Fusion in a Hybrid Tightly Coupled GPS/Dead-Reckoning Positioning System", "IEEE International Conference on Mulitsensor Fusion and Integration for Intelligent System", Sep. 2006, pp. 450-455, Publisher: IEEE.

Kao, "Integration of GPS and Dead-Reckoning Navigation System", "Vehicle Navigation and Information Systems Confrence", Oct. 1991, pp. 635-643, vol. 2, Published in: IEEE.

Mattos , "Integrated GPS and Dead Reckoning for Low-Cost Vehicle Navigation and Tracking", "Vehicle Navigation and Information Systems Conference", Aug. 1994, pp. 569-574, Publisher: IEEE.

McKay et al., "Localization of Mobile Robots Using Magnetic Fields", "Undergraduate Thesis", 1998, pp. 1-18, Publisher: McGill University, Published in: Montreal, CA.

Okeda et al., "Personal Dead-Reckoning System for GPS-Denied Environments", "IEEE Workshop on Safety, Security and Rescure Robotics", Sep. 2007 , pp. 1-6, Publisher: IEEE.

Saab et al., "Map-Based Land Vehicle Nabigation System With DGPS", "Intelligent Vehicle Symposium", Jun. 2002, pp. 209-214, vol. 1, Publisher: IEEE.

Suksakulchai et al., "Mobile Robot Localization Using an Electronic Compass for Corridor Environment", "Proceedings of the IEEE Internatioanl Conferene on Systems, Man and Cybernetics", Oct. 2000, pp. 3354-3359, vol. 5, Publisher: IEEE.

Vicek et al., "GPS/DAD Reckoning for Vehicle Tracking in the "Urban Canyon" Environment", "Proceedings of the Vehicle Anavigation and Information Systems Conference", Oct. 1993, pp. 461, A-34, Publisher: IEEE.

\* cited by examiner

POSITION ESTIMATION FOR NAVIGATION DEVICES

GOVERNMENT INTEREST STATEMENT

The U.S. Government may have certain rights in the present invention under contract no. HDTRA-06-6-C-0058, subcontract no. CHI-06022-001 as awarded by the Defense Threat Reduction Agency.

BACKGROUND

Reliable navigation systems and devices have always been essential for estimating both distance traveled and position. For example, early navigating was accomplished with "deduced" or "dead" reckoning. In dead-reckoning, a navigator finds a current position by measuring the course and distance the navigator has moved from some known point. Starting from the known point, the navigator measures out a course and distance from that point. Each ending position will be the starting point for the course-and-distance measurement. In order for this method to work, the navigator needs a way to measure a course and a way to measure the distance traveled. The course is measured by a magnetic compass. In pedestrian dead reckoning, the distance is the size of a single step. A position estimate is derived by the integration of distance and direction over a sequence of steps. This type of navigation, however, is highly prone to errors, which when compounded can lead to highly inaccurate position and distance estimates.

In more advanced navigation systems, such as an inertial navigation system (INS), positional errors can accumulate over time. For example, any navigation performed in areas where satellite or radar tracking measurements are inaccessible or restrictive (such as areas where global positioning system, or GPS, measurements are "denied") is susceptible to the accumulation of similar positional errors. Moreover, in the dead-reckoning methods discussed above, these positional errors accumulate based on the distance traveled. There is a need in the art for improvements in position estimation for navigation devices.

SUMMARY

The following specification provides for at least one method of position estimation for navigation devices using sensor data correlation. This summary is made by way of example and not by way of limitation. It is merely provided to aid the reader in understanding some aspects of at least one embodiment described in the following specification.

Particularly, in one embodiment, a method of providing position estimation with a navigation device comprises periodically recording magnetic field strength of an area substantially surrounding a navigation device as a user of the navigation device traverses a select pathway. The method combines the recorded magnetic field strength with measurements from at least a dead reckoning portion of the navigation device to provide position estimates along the select pathway. The method further corrects each of the position estimates from a starting position on the select pathway, where each of the corrected position estimates have an error value below one or more previous position estimates and any intervening positions between each of the one or more previous position estimates and the starting position, with the error value corresponding to an error threshold based on the previous position estimates.

DRAWINGS

These and other features, aspects, and advantages are better understood with regard to the following description, appended claims, and accompanying drawings where:

FIG. 5A is a traversing diagram of navigating in a select pathway using a navigation device indicating the positions which are correlated;

Like reference characters denote like elements throughout the figures and text of the specification.

DETAILED DESCRIPTION

Embodiments disclosed herein relate to position estimation for navigation devices using sensor data correlation. For example, at least one navigation device discussed herein substantially reduces positioning errors when the device recognizes that a user of the device is at a previous position. In one implementation, the navigation device discussed herein informs the user that a track crossing event has occurred based on the correlation of accumulated sensor data. Moreover, this event occurrence can be determined manually by the user or automatically detected by the sensors within the navigation device. For example, each track crossing event is detected at recognizable corners, intersections, or bottlenecks found inside a building or along a constrained (that is, a select) pathway. In one embodiment, a laser range-finder or at least one sonar-sounding sensor is coupled to the navigation device to record a characteristic "fingerprint" of each track crossing the user encounters while traversing a select pathway. The device is configurable to automatically and continuously mark likely track crossing points along the select pathway (for example, the device collects tracking data and provides an indication when a current record matches a previously-encountered region). As discussed in further detail below, the device is configurable to adjust and correct positional errors for each of the track crossings detected.

In at least one embodiment, a dead-reckoning (DR) navigation device comprises one or more inertial sensors and one or more magnetic sensors operable to obtain estimates of displacement from a starting point. The track correlation and position recognition discussed herein substantially reduces the accumulated positional errors. For example, as the user travels indoors down halls or corridors, or outdoors along trails and streets, positional corrections can be applied to current and previous position measurements, and continuously "back-propagated" over a history of position estimates between the first and second times the user reaches the same spot. In one implementation, track positions are stored in discrete steps, and the device assigns a correction to each track position by dividing the total error by the number of steps in the interval.

The position estimation methods disclosed herein will not require any additional sensors or communications infrastructure along the select pathways discussed below. For example, existing DR sensors can be used from the DR navigation device. In one embodiment, the DR navigation device uses magnetic sensors for compassing and accelerometers for step counting. Moreover, a processing unit on the DR navigation device is configured to perform the automatic track-crossing recognition and processing based on magnetic field strength measurements of an area substantially surrounding the DR navigation device.

Figure 1:
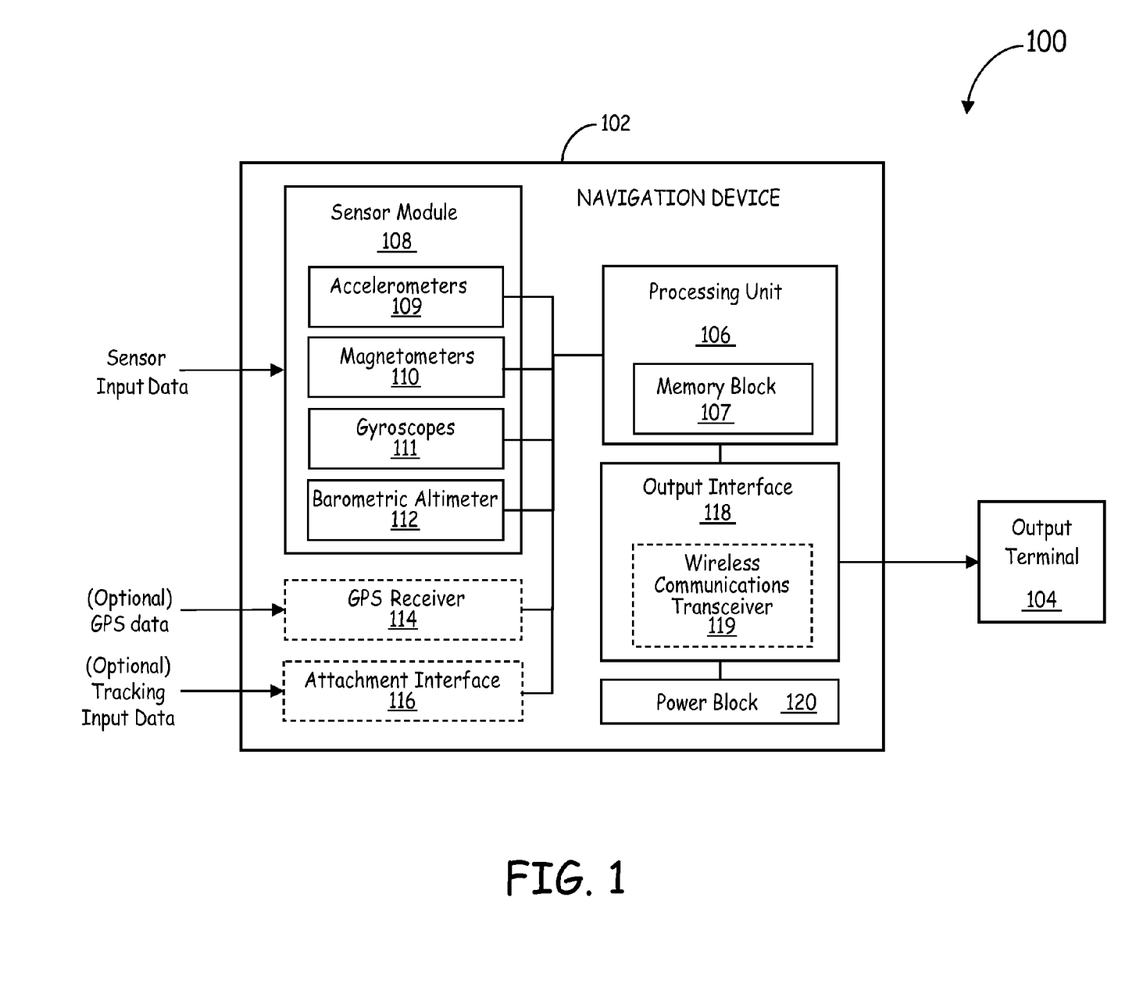
FIG. 1 is a block diagram of a navigation device.

FIG. 1 is an embodiment of a navigation system 100 (for example, a personal navigation system operable in an enclosed environment). The system 100 comprises a navigation device 102 and an output terminal 104 communicatively coupled to the navigation device 102 through an output interface 118. In one embodiment, the output interface 118 further comprises a wireless communications transceiver 119. The navigation device 102 comprises a processing unit 106, a sensor module 108, and a power block 120 that provides electrical power to the navigation device 102 and, in one implementation, the output terminal 104. In the example embodiment of FIG. 1, the navigation device 102 comprises an optional global positioning system (GPS) receiver 114 in operative communication with the processing unit 106 and an optional attachment interface 116 communicatively coupled to the processing unit 106. In one embodiment, the optional attachment interface 116 receives navigation input data (for example, from a manual marking device or the like coupled to the optional attachment interface 116 in order to record a characteristic fingerprint of the track over which a user travels). In the example embodiment of FIG. 1, the sensor module 108 comprises at least a portion of the navigation device 102 operable as a dead reckoning module. In the same embodiment, the output terminal 104 provides position estimation data to a user of the navigation device 100 (for example, the position estimation data processed by the navigation device 102). In this same embodiment, the dead reckoning portion of the navigation device 102 is operable within a sensor measurement range as indicated to the user.

The sensor module 108 comprises one or more accelerometers 109 and one or more magnetometers 110. In one implementation, the sensor module 108 further comprises one or more gyroscopes 111 and a barometric altimeter 112. It is understood that the sensor module 108 is capable of accommodating any appropriate number and types of navigational sensors and sensor blocks operable to receive sensor input data (for example, one or more of the accelerometers 109, the magnetometers 110, the gyroscopes 111, the barometric altimeter 112, and the like) in a single sensor module 108. In the example embodiment of FIG. 1, the processing unit 106 comprises at least one of a microprocessor, a microcontroller, a field-programmable gate array (FPGA), a field-programmable object array (FPOA), a programmable logic device (PLD), or an application-specific integrated circuit (ASIC). In one implementation, the processing unit 106 further comprises a memory block 107. The memory block 107 records at least each of the recognized track crossings measured by the sensor module 108.

In operation, the sensor module 108 provides position estimates based on magnetic field strength and heading data (for example, azimuth data). In one embodiment, the azimuth data is provided by the dead reckoning portion of the sensor module 108. The processing unit 106 records the position estimates along with the magnetic field measured by the sensor module 108 of an area substantially surrounding a user of the navigation device 102. The processing unit 106 measures a track crossing based on a comparison of the magnetic field strength at a current position and one or more previous position estimates. As discussed in further detail below with respect to FIGS. 4A to 4C, for each measured track crossing, the processing unit 106 aligns the current position with the one or more previous position estimates and adjusts an accumulation of measurement error below an error threshold based on the one or more previous position estimates. In the example embodiment of FIG. 1, the processing unit 106 corrects any intervening positions and error estimates between the current position and the one or more previous position estimates, as discussed in further detail below.

In one embodiment, the navigation device 102 comprises at least three magnetometers 110 to provide the heading data within the surrounding magnetic field in at least three orientations. Further, the navigation device 102 comprises at least three accelerometers 109 for step counting and the estimation of vertical in three axes for movements in at least three dimensions. The position estimation performed by the navigation device 102 provides at least one method of correction for position estimates based on at least an error threshold. For example, the sensor module 108 is operable to continually measure the azimuth data from the at least three magnetometers 110 on a sensor channel. Moreover, the sensor module 108 is further operable to provide the position estimates to the processing unit 106. In the example embodiment of FIG. 1, the position estimates are iteratively adjusted based on the error threshold, as discussed in further detail below with respect to FIGS. 5A to 5C. In one implementation, the processing unit 106 automatically recognizes the measured track crossings by correlating the magnetic field strength and the heading data between the current position and the one or more previous position estimates. In this same implementation, the processing unit 106 qualifies the current position based on correlation threshold criteria for the sensor module 108 (discussed in further detail below with respect to FIG. 10).

Figure 2A:
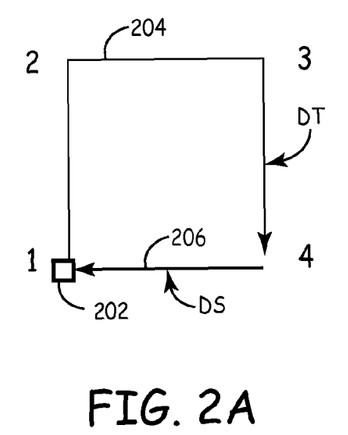
FIGS. 2A and 2B are traversing diagrams of navigating in a select pathway.
Figure 2B:
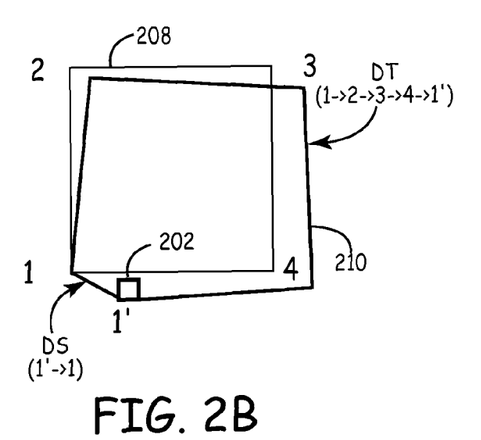

FIGS. 2A and 2B are traversing diagrams of navigating in a select pathway. In the example embodiments of FIGS. 2A and 2B, a navigation device 202 (representative of the navigation device 102 of FIG. 1) is worn by a user. The user marks potential track crossings using the navigation device 102. In one implementation, the user provides a marking signal from one of a manual marking device, a push button device, or the like. The next time the user crosses through the same position, the user marks the position a second time. For example, in FIG. 2A, the user having the navigation device 202 traverses along three sides of a path 204 that is 25 meters square, starting from the position labeled '1', and proceeding around to a position '4'. The track path 204 (labeled as "DT" in FIG. 2A) will be 75 meters. Moreover, a straight line distance 206 (labeled as "DS" in FIG. 2A) between the position 1 and the position 4 is 25 meters.

In one implementation, a measure of the accumulated error between positions 1 and 4 along the select pathway comprises two distances: the first is the straight line distance "DS" between the two positions, and the second is the length of the path traveled "DT" between the two positions '1' and '4'. A positional error measure E is provided below in Equation 1, further expressed as a percent in Equation 2 below.

$$E = DS/DT \quad \text{(Equation 1)}$$

$$E = 100*(DS/DT)\% \quad \text{(Equation 2)}$$

In the example embodiment of FIG. 2A, the positional error is 25 m/75 m, or 0.33 (from Equation 1), or 33% (Equation 2). The select pathway depicted in FIG. 2B illustrates the user traversing around a square path 208 back to the starting position 1. As shown in FIG. 2B, positional errors accumulate in a position estimate provided by the navigation device 202, resulting in the navigation device 202 directing the user along a path 210 to the position 1' instead of 1. For example, if position 1 and position 1' are three meters apart, then the measure of error is 3 m/100 m, or 0.03 (3%). For each position marking event, all marks that lie outside a error threshold range are disregarded, and marks at or below the error threshold are ranked according to the error measure in Equation 1.

As discussed in further detail below, any accumulated positional errors from the last time the user was at that same position are substantially eliminated using the position estimation methods provided by the navigation device 102. For example, when a position estimate drifts off by 3 meters as illustrated above, the navigation device 102 readjusts a current position back to the previous tracked position by subtracting off the 3 meter drift from a current position. As a result, the position error estimate is reduced to that which was originally associated with that position. Moreover, this correction is not only applicable to the current position, but also back propagated continuously over a history of position estimates between the first and second times the same position was reached. In the example embodiments of FIGS. 2A and 2B, track positions are stored by discrete steps in the navigation device 202. Accordingly, a correction is assigned to each step by dividing the total error by the number of steps in the interval.

Figure 3A:
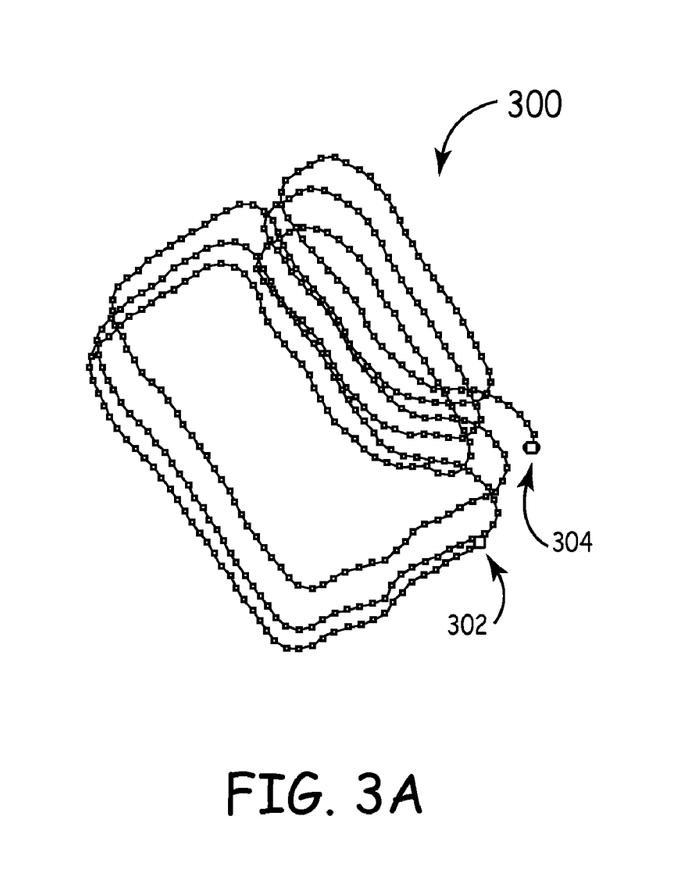
FIG. 3A is a traversing diagram of navigating in a select pathway prior to position correction.
Figure 3B:
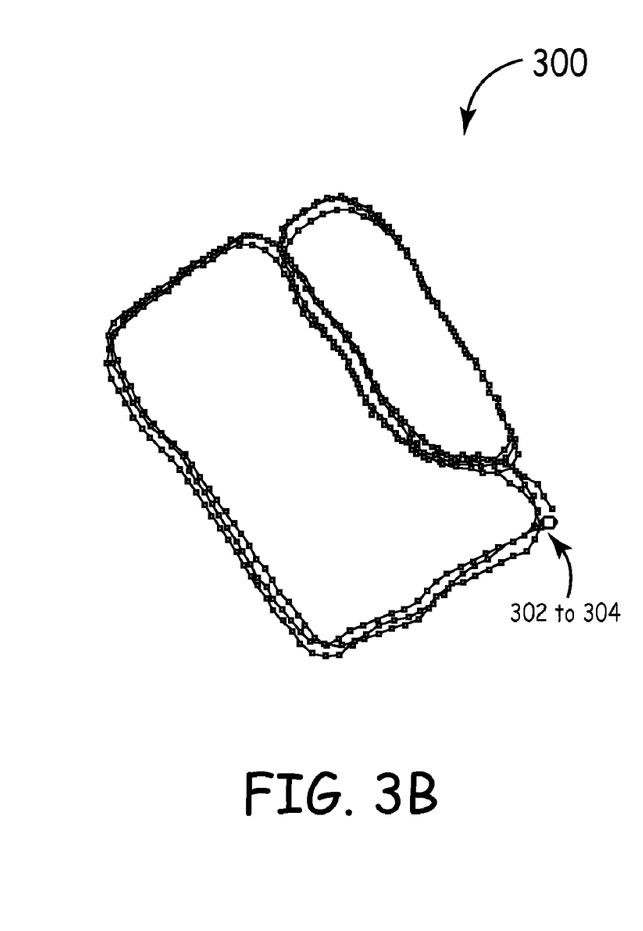
FIG. 3B is a traversing diagram of navigating in the select pathway of FIG. 3A after position correction.

FIG. 3A is a traversing diagram of navigating in a select pathway 300 prior to correction. FIG. 3B is a traversing diagram of navigating in the select pathway 300 after position correction. For example, in one implementation, starting position 302 and ending position 304 are manually marked by a user of the navigation device 102 (FIG. 1) as the user traverses the select pathway 300. To further illustrate this example, after the user marks the positions 302 and 304, the dead reckoning portion of the navigation device 102 estimates the position 302 and the position 304 to be about six meters apart after traversing a total of 330 meters. Accordingly, the processing unit 106 in the navigation device 102 calculates the error measure E for this pair of points E=6 m/330 m=0.018. The processing unit 106 compares the error measure E to a predetermined error threshold $E_t$ (for example, when $E_t$=0.02, the estimated error is expected to be no more than 2% of the distance traveled). Since the error measure E between positions 302 and 304 passes this criterion (1.8%), the correction is applied. In one embodiment, north and east corrections are applied independently. For example, at each data point between the two marked positions 302 and 304, the correction is applied as illustrated below in Equation 3:

$$-DS_e/N, -DS_n/N \quad \text{(Equation 3)}$$

With respect to Equation 3, $DS_e$ is the error in the east direction, and $DS_n$ is the error in the north direction, and N is the number of data points. In one implementation, a sample point measurement is taken by the navigation device 102 at each step. In the example embodiment of FIG. 3A, there are 415 steps taken from start to finish. Moreover, using sample error components of 2.4 meters east as $DS_e$, and 5.3 meters north as $DS_n$, a linear correction of (−2.4/415) meters in the east direction and (−5.3/415) meters in the north direction is applied to each step using Equation 3. The result is shown in FIG. 3B. The positions 302 and 304 are aligned to provide details of the select pathway 300. It is understood that in alternate implementations, additional methods of error correction based on time (for example, quadratic error growth estimation) or similar variables can be used to provide the position estimation discussed herein. Moreover, additional correlations are possible from the magnetic field strength recordings as discussed in further detail below with respect to FIGS. 4A to 4C.

Figure 4A:
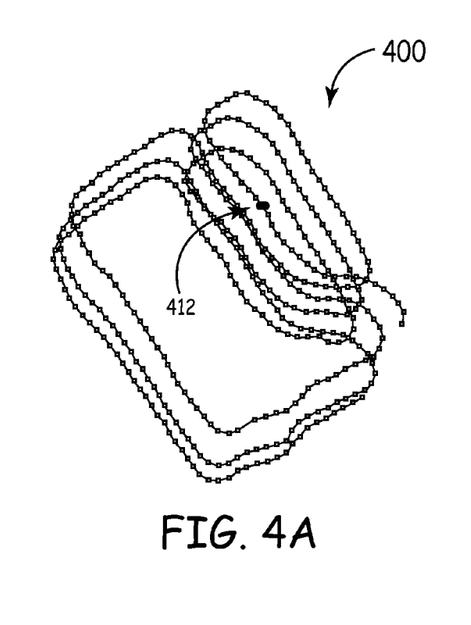
FIG. 4A is a traversing diagram of a select pathway with at least one marked position before sensor data correlation at a selected position.
Figure 4B:
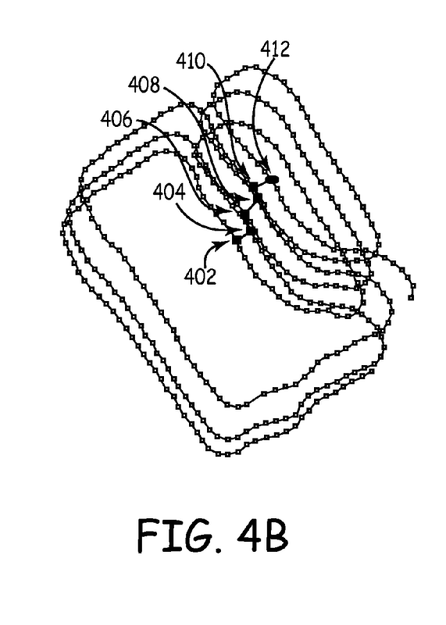
FIG. 4B is a traversing diagram of navigating in a select pathway showing one or more positions that correlate with the marked position of FIG. 4A.
Figure 4C:
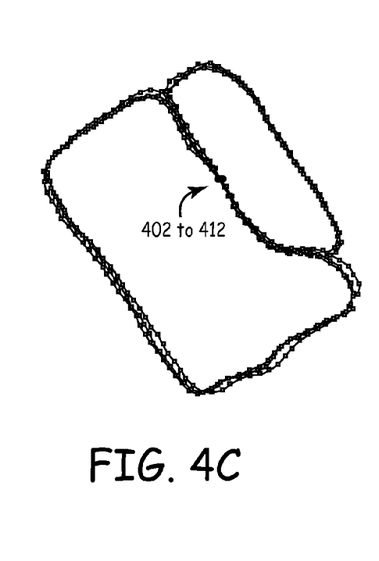
FIG. 4C is a traversing diagram of navigating in the select pathway of FIG. 4B after the correlated positions have been corrected.

FIG. 4A is a traversing diagram of a select pathway 400 with at least one marked position. FIG. 4B is a traversing diagram of navigating in the select pathway 400 after a correlation calculation has identified one or more candidate positions that substantially match the marked position estimate of FIG. 4A. FIG. 4C is a traversing diagram of navigating in the select pathway 400 after track corrections have been applied. In the example embodiment of FIG. 4A, a position 412 is marked by a navigation device, similar to the navigation device 102 of FIG. 1, as a user traverses the select pathway 400. As an example of automatic track crossing detection, the track correlation process begins at the most recent position 412 and works backwards over a stored history of position and sensor data. The navigation device 102 has a magnetic fingerprint of the position 412, and the navigation device 102 searches backwards through the select pathway 400 for similarly-matching magnetic fingerprints. In the example embodiment of FIG. 4B, positions 402 to 410 are automatically compared to the marked point 412. The navigation device 102 uses an automatic correlation function to determine if any of the other positions shown in FIG. 4B are a match (for example, any of the positions 402, 404, 406, 408, and 410) with respect to the starting position 412.

In operation, the track correlation process occurs in three interval phases: (1) mark, (2) link, and (3) adjust. In the marking phase, a region of interest is selected as the user passes it. In one implementation, selecting the region of interest is done at discrete times manually by the user. In at least one alternate implementation, selecting the region is accomplished continuously and automatically by the navigation device 202. When the region of interest is selected, the selected position is compared pairwise with any prior position markings. When a match is found, the two positions are automatically linked and the positions adjusted as discussed below with respect to FIG. 11. For example, in one implementation, the navigation device 102 determines which of the positions 402 to 412 to link together. For each matching fingerprint identified in near real time, the processing unit 106 evaluates the error between a current position and all the previous matching positions. As discussed in further detail below with respect to FIGS. 9 to 11, the positional estimates are further reduced below a dead-reckoning (DR) error threshold due to the correction of previous position estimates.

When the estimate of the position 402 is outside the DR error threshold with respect to the position 412, the cascaded corrections between the positions 404 to 412 bring the estimates of the positions 402 and 412 below the DR error threshold (for example, below the estimated position error as a percentage of the distance traversed along the select pathway 400).

For an iterative adjustment, applying multiple corrections can result in subsequent corrections reversing a portion of the adjustment of previous corrections. In one implementation, the track correlation discussed above is performed automatically based on the correlation of sensor data from at least two different periods of recorded magnetic field strength on a sensor channel, as shown by the repetitive traversal along the select pathway 400. For example, when applying the correction between the positions 402 and 412 linearly to all the points between the positions 402 and 412, at least a portion of the points between the positions 402 and 412 will be separated. In one implementation, adjustments are made from the positions 412 to 410, excluding the data between the positions 408 and 410 and the correction is further applied between the positions 402 and 404. The track correlation discussed here substantially reduces errors in the position estimation, as further discussed below with respect to FIGS. 8 and 9.

Figures 5A, 5B:
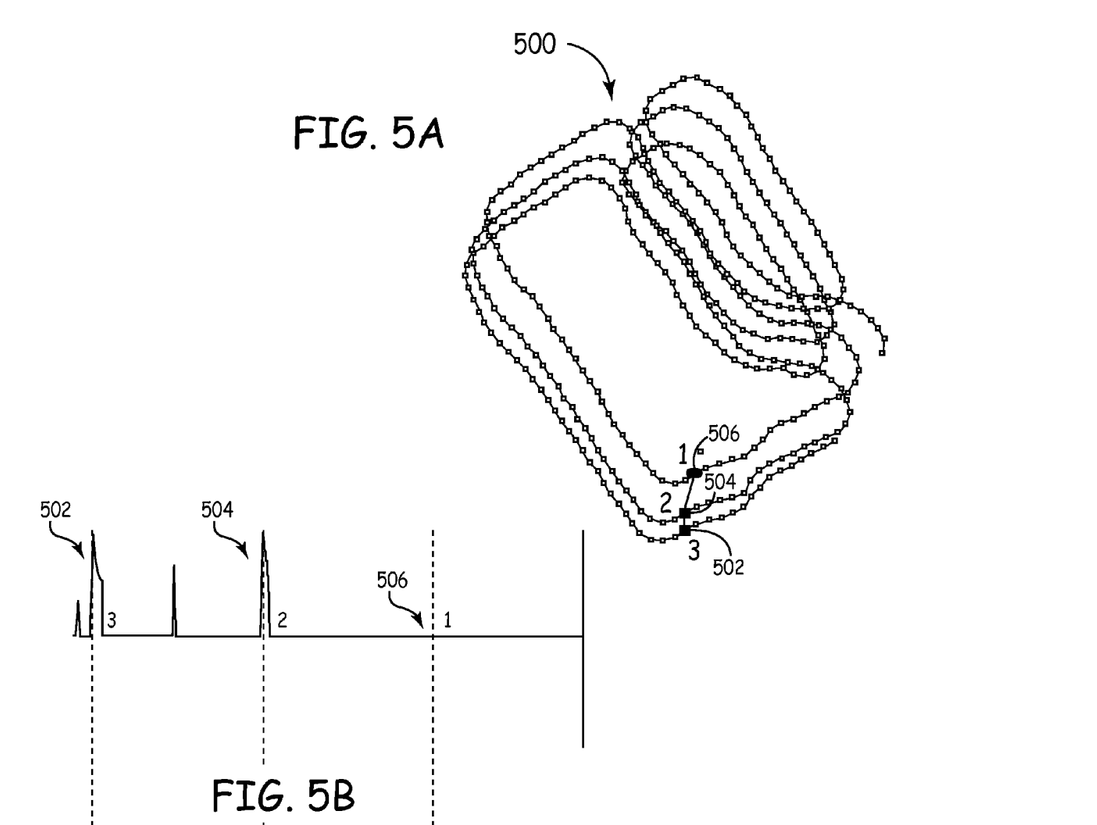

FIG. 5A is a traverse diagram of navigating in a select pathway 500 using a navigation device (for example, the navigation device 102 of FIG. 1) having at least one marked position 506 and one or more correlated positions (for example, positions 504 and 502) which have been linked to the at least one marked position 506. In the example embodiment of FIG. 5A, the magnetometers 110 of the navigation device 102 are continuously recording heading data; so as a user traverses the select pathway 500 the heading exhibits a small variation before reaching the marked position 506 and then rises afterwards as the user turns from a southwesterly to a northwesterly direction, for example. A correlation function is calculated for all points prior to the position 506 to determine if this fingerprint is matched by any other point along the select pathway 500 as further discussed below with respect to FIG. 5C. FIG. 5B illustrates the calculated correlation of the heading at 506 with the previous sample points along the select pathway 500. For example, two spikes in the correlation function at positions 504 and 502 are identified as candidates for linking and adjusting. In one embodiment, a range of the correlation function is from −1 to +1, with values near +1 considered a high correlation. Additional objects and magnetic fields substantially surrounding the pathway 500 provide unique signatures based on at least the azimuth data recorded by the navigation device 102 as the user traverses the select pathway 500. The unique signatures are correlated with the magnetic field strength data as discussed below.

In the example embodiment of FIG. 5A, a point at the bottom of the pathway 500 near the first curve is marked with crossing points 3 (point 502), 2 (point 504) and 1 (point 506). Using the correlation tracking discussed above, the navigation device 102 discovers like points using the azimuth signature data within the magnetic field recordings. A sample result is shown in FIG. 5B. For example, point 506 in FIG. 5B represents a position of the most recent section of heading data (that is, point 1) of FIG. 5A. The two peaks 502 and 504 in the correlation graph are the other two linked data points, points 3 and 2. It is further indicated in FIG. 5B that a majority of the correlation plot is flat-line. In the example embodiment of FIG. 5B, data correlation is only performed when the DR constraint is met (for example, when the error threshold calculated in Equation 2 is less than 2 percent). When the DR constraint is not met, then the correlation is set to zero. The source data for each of the linked data points 1, 2, and 3 is shown in FIG. 5C.

Figure 5C:
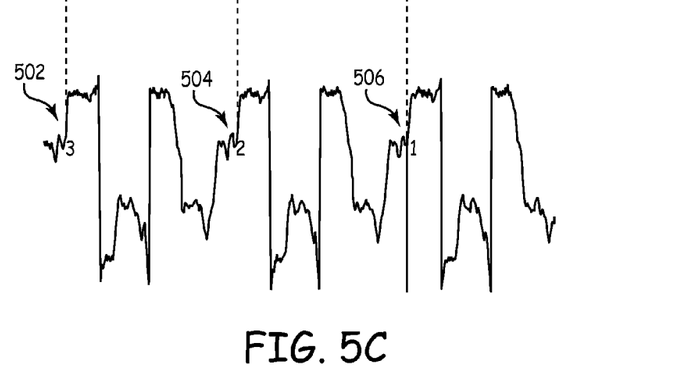
FIG. 5C is the azimuth data and 5B is the calculated correlation function diagram from the navigation device of FIG. 5A.

FIG. 5C is a signal diagram from the navigation device 102 traversing the select pathway 500. From the source heading data shown in FIG. 5C, the correlation data is calculated from at least one of the sensor channels of the navigation device. For example, after selecting the marked position 506 (data point 1), the correlation function is calculated for the data points 2 and 3 (positions 504 and 502, respectively) representing at least two data sets, x and y, as illustrated below in Equation 4.

$$r_{xy} = \Sigma (x_i - x_m)(y_i - y_m)/((n-1)s_x s_y) \qquad \text{(Equation 4)}$$

With respect to Equation 4, $x_m$ is the mean of the n data points of x, $s_x$ is the standard deviation of x, and similar definitions hold for the y data set. In the example embodiment of FIG. 5C, an auto-correlation is determined, meaning that the two sets of data x and y are taken from the same series of points, but separated in time.

In detecting the azimuth signature data discussed here, an acceleration vector is recorded by the navigation device 102 to provide additional navigation information. For example, as shown in Table 1 below, an M-A dot product of the acceleration vector with the magnetic vector is constant and proportional to the dip angle of the Earth's magnetic field. The dot product is used to detect ripples in the magnetic field strength recordings. Since the azimuth and magnetic field strength measurements are static, the dot product is dependent on motion of the user. If the dot product correlates at any of the positions identified in FIG. 5A, then not only is the user at the identified position, the user is also traveling with a near similar motion to when the user passes the position on the second and subsequent times. As a result, the example data recordings shown in Table 1 below provide a fingerprinting capability based on the dead reckoning measurement portion of the sensor module 108. With respect to Table 1 below, the columns of data are organized as follows:

Steps: The number of steps taken

East: Displacement from a starting point in the east direction (meters)

North: Displacement from a starting point in the north direction (meters)

Heading: The direction in which the step is taken

Normalized magnetic field: The magnitude of the observed magnetic field divided by the nominal field at the location M-A Dot product: The cosine of the angle between the magnetic field and the acceleration vector

TABLE 1

Sample Magnetic Field Data

| Steps | East (m) | North (m) | Heading (degrees) | Normalized magnetic field | M-A Dot product |
|---|---|---|---|---|---|
| 0 | 0.0 | 0.0 | 248.2 | 1.062 | 0.877 |
| 1 | −0.7 | −0.3 | 240.0 | 1.058 | 0.898 |
| 2 | −1.4 | −0.7 | 248.0 | 1.062 | 0.903 |
| 3 | −2.1 | −1.1 | 241.6 | 1.026 | 0.863 |
| 4 | −2.8 | −1.5 | 243.5 | 0.987 | 0.849 |
| 5 | −3.4 | −1.9 | 235.6 | 1.007 | 0.838 |

With respect to Table 1 above, the recorded magnetic field is normalized to retain any measurement variations. The dot product between the normalized magnetic vector and the normalized gravity vector is relatively constant and equal to the cosine of the angle between the magnetic vector and the acceleration of gravity. The measurement variations discussed here are due to fluctuations in the magnetic field and user motion coupled with the estimation of the gravity vector.

In operation, the navigation device 102 periodically records magnetic field strength of an area substantially surrounding a user of the navigation device 102. The navigation device 102 combines the recorded magnetic field strength with measurements from at least a dead reckoning portion of the navigation device to provide position estimates. The navigation device 102 corrects each of the position estimates from a starting position, where each corrected position estimate has the lowest error value of all the recorded position estimates provided by the navigation device 102 and any intervening positions between each corrected position estimate and the starting position. In the example embodiment of FIG. 5A, the lowest error value corresponds to an error threshold based on previous position estimates, as discussed in further detail below with respect to FIGS. 7 to 10.

In one implementation, the navigation device 102 measures track crossings based on at least one terrain characteristic of a current track that the user of the navigation device 102 is traversing (for example, the select pathway 500), where the navigation device 102 has no prior knowledge of the terrain or the track prior to the start of the movement. Moreover, for each measured track crossing, the navigation device 102 correlates the current position at the track crossing with the recorded position estimates to adjustably align the position estimates processed at the navigation device to within the error threshold. The navigation device 102 corrects the current position estimate by qualifying the accumulated magnetic field strength measurements, where the accumulated measurements substantially within a sensor measurement range having at least one qualifier. For example, as discussed in further detail below with respect to FIGS. 9 to 11, the navigation device 102 applies measurement corrections in an iterative process until all accumulated position measurements are adjusted to within the error threshold.

Figures 6A, 6B:
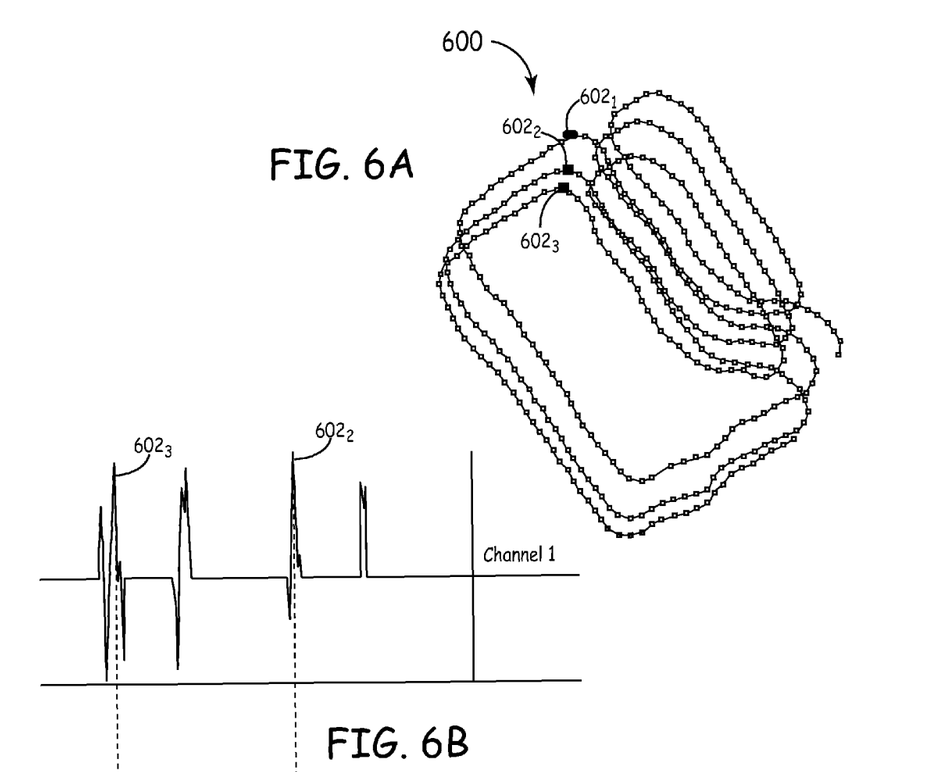
FIG. 6A is a traversing diagram of navigating in a select pathway using a navigation device having at least one marked position and one or more correlated positions.
FIGS. 6B and 6C are calculated correlation data diagrams for sensor data channels from the navigation device of FIG. 6A.
Figure 6C:
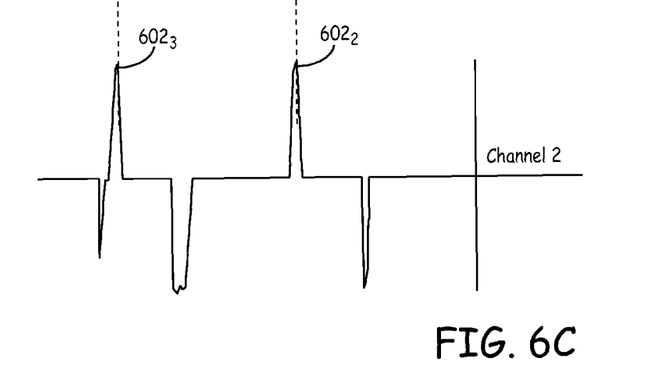
Figure 7:
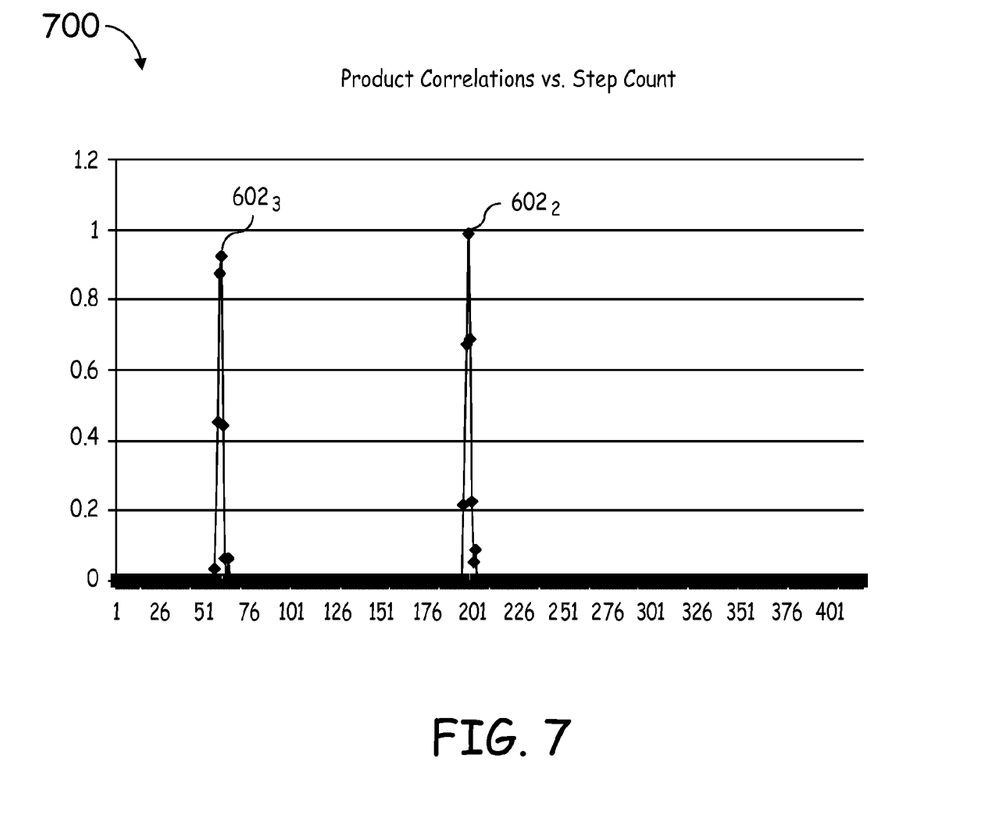
FIG. 7 is a diagram in graphical form illustrating product correlation as provided by the correlation data of FIGS. 6B and 6C.

FIG. 6A is a traverse diagram of navigating in a select pathway 600 using a navigation device which uses correlations to improve the position estimates (for example, the navigation device 102 of FIG. 1). FIGS. 6B and 6C are diagrams of the calculated correlations on at least two sensor data channels from a navigation device traversing the select pathway 600. In the example embodiment of FIG. 6A, positional data is recorded on a plurality of data channels from the sensor module 108 of FIG. 1. In one implementation, the at least two sensor data channels are combined to provide navigational measurement data. As shown in FIG. 6A, a selectable track point $602_1$ is located near the top of the left loop. The processing unit 106 calculates an auto-correlation of both the magnetic field and the heading. FIG. 6B illustrates the auto-correlation of the magnetic field channel (Channel 1). FIG. 6C illustrates the heading channel (Channel 2). FIG. 6A illustrates that there are only two other positions $602_2$ and $602_3$ along the select pathway 600 that have the same azimuth and magnetic environment. In the example embodiment of FIGS. 6B and 6C, positive values of both channels 1 and 2 are multiplied together as a product correlation. For example, the plot of the result (FIG. 7) peaks at the two positions $602_2$ and $602_3$.

In operation, at a first time, the navigation device 102 continually records position estimate measurements along the select pathway 600 based on a measured magnetic field strength. On at least a second time of traversing the select pathway 600, the navigation device 102 automatically determines and combines a first position estimate with a navigation signature from at least one data channel as a track crossing. In one embodiment, the at least one data channel corresponds to at least one navigational sensor of the navigation device 102. Once the track crossing is determined, the navigation device 102 aligns the first position estimate of the track crossing with one or more previous position estimates from one or more previous track crossings, where the first position estimate is adjusted to within a selectable error threshold based on at least one of the previous position estimates and any intervening positions between the at least one previous position estimate and the first position estimate.

In one implementation, the processing unit 106 continually records the position estimate measurements and combines the measured magnetic field strength with at least one azimuth measurement from the dead reckoning portion of the sensor module 108. Moreover, in automatically determining and combining the first position estimate with the navigation signature from the at least one data channel, the processing unit 106 qualifies the magnetic field strength measurements based on at least one correlation qualifier corresponding to a sensor measurement range of the at least one data channel, as discussed in further detail below with respect to FIG. 10. The processing unit 106 further ranks the qualified measurements as a percentage of the actual distance between the one or more previous track crossings over a total distance traveled along the select pathway 600. For example, the processing unit 106 links a current track crossing with at least one of the previous track crossings based on a correlation of sensor data from at least the first and second time periods of magnetic field strength measurements and, in one embodiment, combines the correlation of sensor data at each of the track crossings to obtain a product correlation. In linking the current track crossing with the previous track crossing, the processing unit 106 iteratively applies a correlation process to each of the linked track crossings until all accumulated position estimate measurements are adjusted to substantially match the first position estimate within the selectable error threshold. As discussed in further detail below with respect to FIG. 11, the processing unit 106 uses the product correlation to adjust each of the position estimates between a pairing of the position estimates with the highest correlation that exceeds a correlation threshold until each of the previous position estimates are at or below the selectable error threshold.

Figure 8:
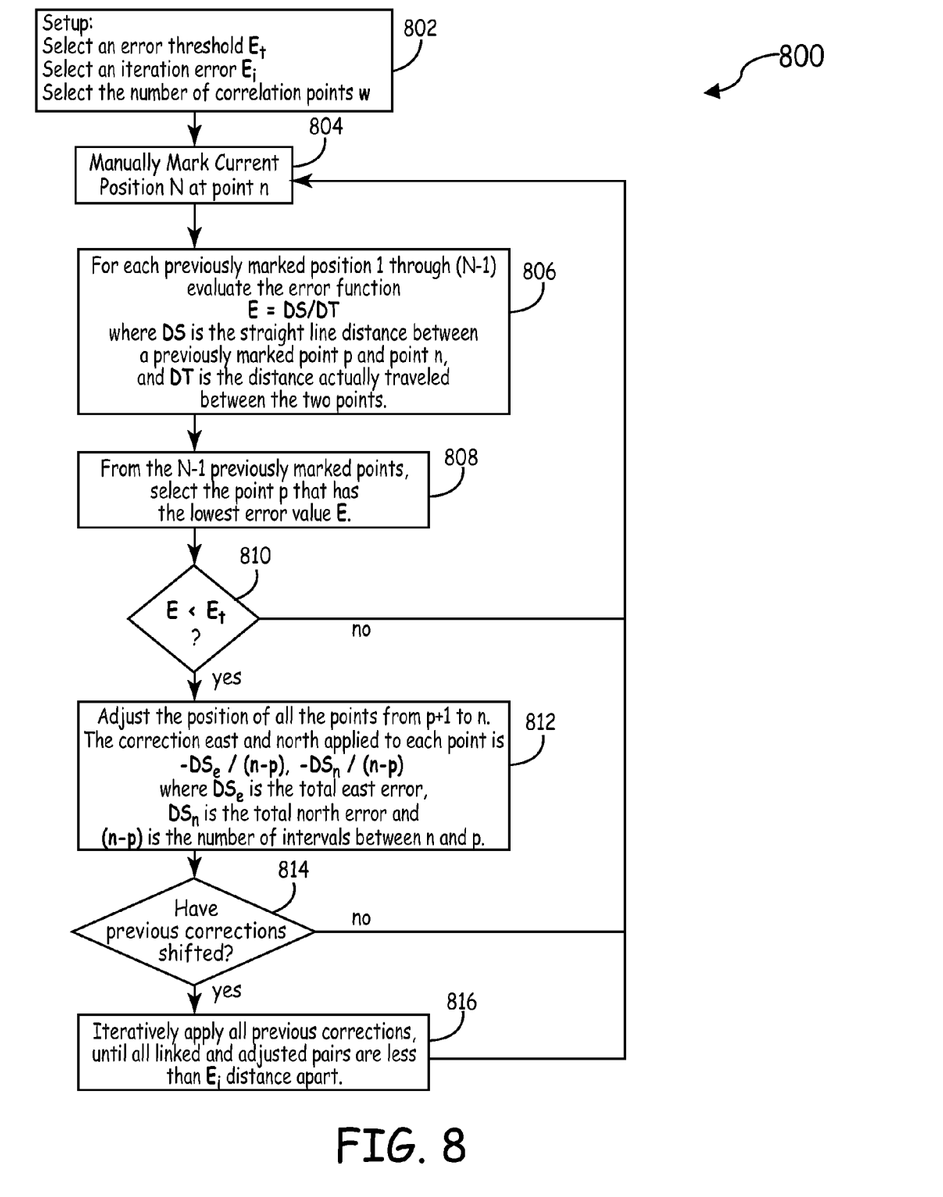
FIG. 8 is a flow diagram of a method for providing position correction in a navigation device.

FIG. 8 is a flow diagram of a method 800 for providing position estimation in a navigation device. The method of FIG. 8 addresses a process flow for manual marking of track crossings and adjusting for positional error measurements. The method 800 selects a dead-reckoning (DR) error threshold as an iteration error criterion $E_i$ used when one correction disturbs an earlier correction. In the method of FIG. 8, an iterative process is provided to resynchronize each measured position to within an acceptable value. In one embodiment, corrections are applied from oldest to newest position pairs repeatedly until the linked positions are less than the iterative error criterion $E_i$ (for example, where $E_i$ is less than or equal to the size of one step). In the same example embodiment, the method 800 further selects a number of correlation points w (block 802).

As a user traverses a select pathway, identifiable landmarks are marked (block 804). For each marked position, the method 800 compares the marked position to all previously marked positions using the Equation 1 error estimate (block 806). Next, the method 800 selects a point p that has the lowest value for the error estimate (block 808). The method 800 compares the error estimate at point p with the error threshold E, (block 810). When the error estimate is greater than or equal to $E_t$, the method 800 prepares to mark the next landmark (block 804). When the error estimate at point p is less than the threshold, the method 800 adjusts the position of all the points from p+1 to n (block 812). The incremental change applied to each point is DS/(n−p). The method 800 determines that the adjustment(s) made to the points between p and n have not disturbed any previous adjustments (block 814). For example, a disturbance occurs if the range of points overlaps with another adjustment. If no disturbances exist, the method 800 prepares to mark the next landmark (block 804). When a previous correction is shifted, the method 800 readjusts all linked pairs until each error is at or below the value of $E_i$ (block 816) before the method 800 prepares to mark the next landmark (block 804).

Figure 9:
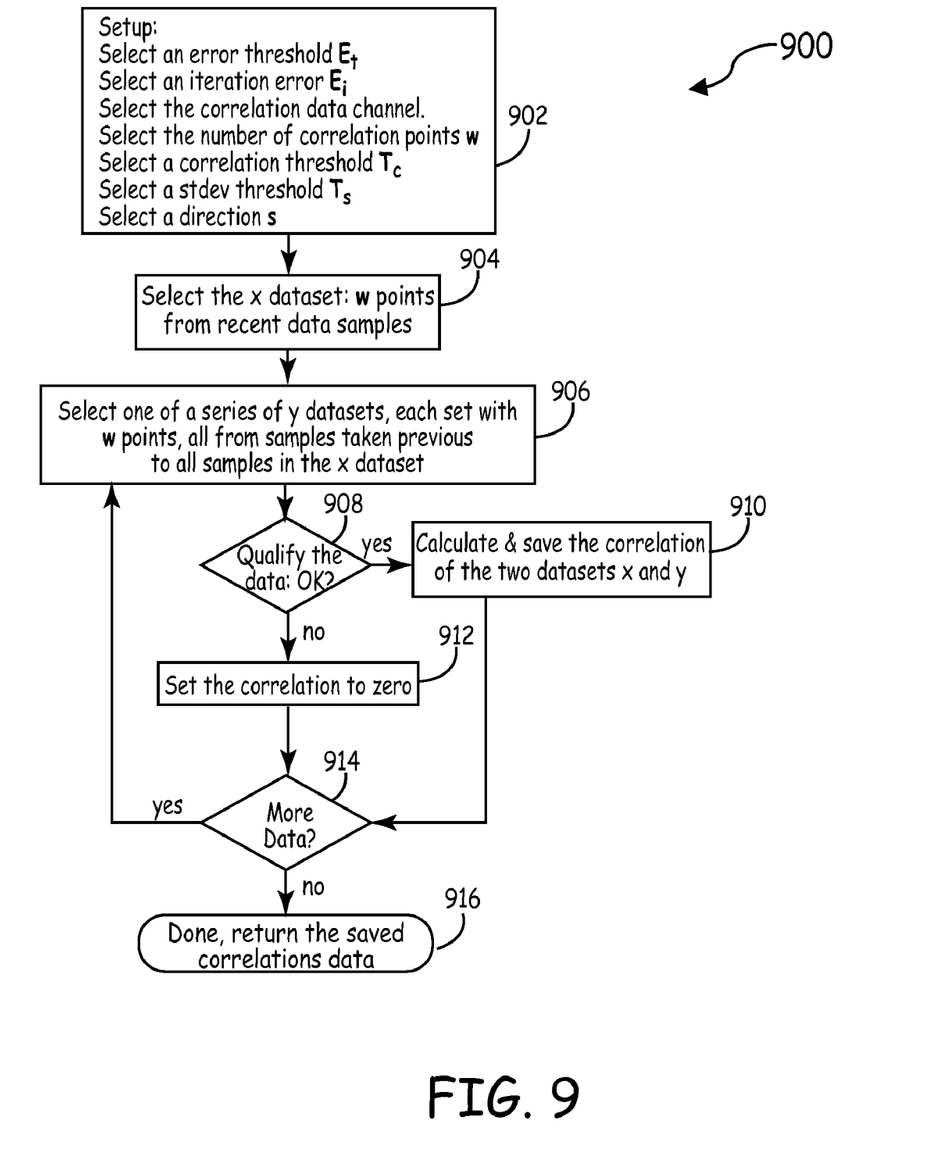
FIG. 9 is a flow diagram of a method of correlating position measurements in a navigation device.

FIG. 9 is a flow diagram of a method 900 of correlating position measurements in a navigation device. The method of FIG. 9 addresses the process of performing a track correlation. The output of the method 900 is a dataset representing the correlation of one recent section of tracking data with previously acquired tracking data. In the example embodiment of FIG. 9, the method 900 defines the values of the parameters and thresholds that are used in the process (for example, the direction that the correlation is to be run is indicated by an s flag) at block 902. The method 900 selects the elements of x data set(s) from recent data samples (block 904), for example, the last w samples taken. In one embodiment, the method 900 limits the selection to data samples around a predetermined manual mark (for example, a manual mark taken every k seconds) and selects the elements of y data set(s) from the recent data samples (block 906). For example, all sets of w contiguous data points are possible, and any set that overlaps with the x data set is excluded. In one implementation, the method 900 limits the data to regions around manually marked points (for example, regions within a sensor measurement range of the navigation device). The method 900 qualifies the data for correlation at block 908, as further discussed below with respect to the method illustrated in FIG. 10. For accepted data qualification, the method 900 calculates the correlation for this data point (block 910) and proceeds to discover additional data (block 914). For disqualified data, the method 900 sets the correlation to zero (block 913) before proceeding to discover additional data at block 914. Once all of the y data sets have been processed, the method 900 saves the correlation data (block 916).

Figure 10:
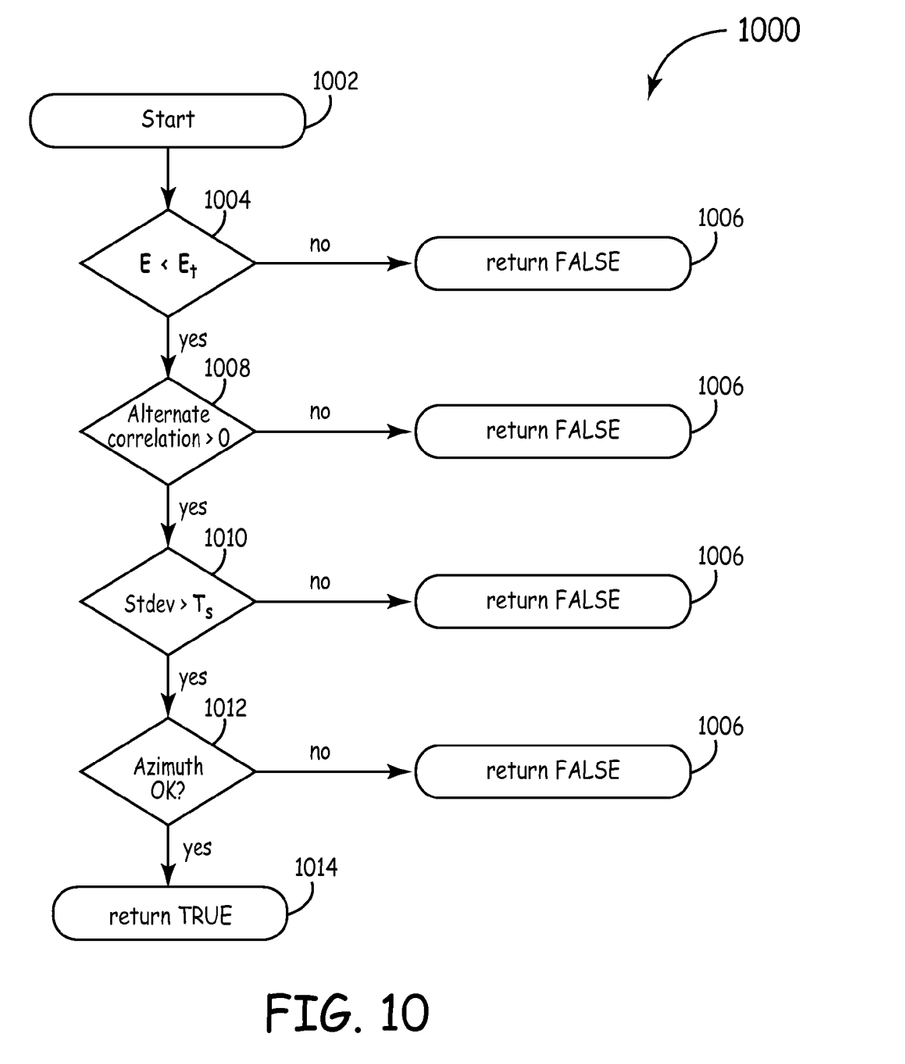
FIG. 10 is a flow diagram of a method of qualifying navigation data from the navigation device of FIG. 9.

FIG. 10 is a flow diagram of a method 1000 of qualifying navigation data from a navigation device. The method of FIG. 10 addresses qualifying the data from block 908 of FIG. 9 with a plurality of correlation threshold criteria. The method of FIG. 10 starts at block 1002. In the example embodiment of FIG. 10, a first criterion is whether the navigation data passes the dead-reckoning (DR) error threshold (block 1004). In one implementation, the error is calculated from Equation 1, and the DR error threshold is set to a value determined in the method 900 (discussed above with respect to FIG. 9) appropriate to the application. Moreover, for the correlation of data from multiple navigational sensor channels, previous correlations are used to determine if the entire correlation calculation is to be repeated as a second criterion (block 1008). For example, when an alternate channel correlation is less than zero, the current correlation calculation is bypassed. Moreover, a third criterion comprises when the data is within a predetermined standard deviation, the qualification method 1000 will not attempt the calculation (block 1010). In the example embodiment of FIG. 10, the correlations are considered effective when the navigation device traverses the same path twice. For example, if the azimuth is the same, or 180 degrees out of phase, the data is qualified for further correlation calculations (block 1012). When all of the correlation threshold criteria passes, the method 1000 returns TRUE (block 1014), otherwise the method 1000 returns FALSE (block 1006) as shown in FIG. 10.

Figure 11:
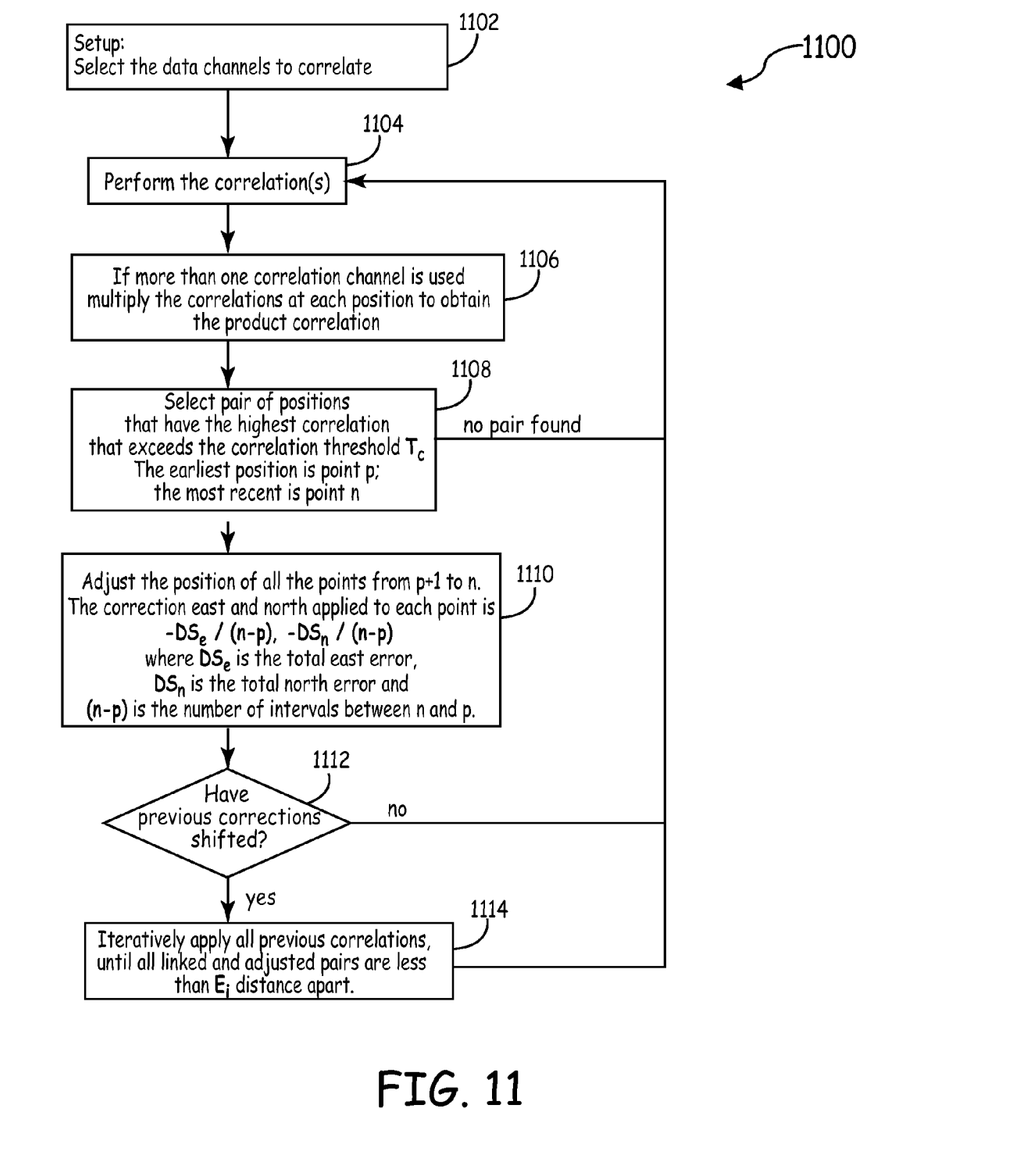
FIG. 11 is a flow diagram of a method of correlating position measurements in a navigation device.

FIG. 11 is a flow diagram of a method 1100 of correlating position measurements in a navigation device. In one embodiment, the measurement data correlations performed by the method 1100 are similar to the correlations performed in the method 900 of FIG. 9. The method of FIG. 11 addresses linking and adjusting the navigational data with correlations from the method 900. In one implementation, the data channels are selectable (block 1102). For example, when more than one channel is being correlated, a separate calculation on the data with the samples reversed is performed to account for traversing the same select path in an opposite direction (block 1104). Moreover, for multiple correlations in the same direction, the method 1100 combines the data as a product correlation (that is, multiplying data point by data point) at block 1106.

The method 1100 continues by selecting a pair of positions that has the highest correlation (for example, two linked points). If their correlation is higher than a correlation threshold $T_c$, then they are a candidate. The candidate with the highest correlation (for example, the lowest error value) is selected for adjustment (block 1108). Moreover, when there are no candidates within a predetermined error threshold range (block 1110), the method 1100 returns to block 1104 to wait for the next x dataset. The method 1100 adjusts the positions of p and n and all the points between, similar to the method 800 of FIG. 8. For example, the method 1100 determines that the adjustment(s) made to the points between p and n have not disturbed any previous adjustments (block 1112). For example, a disturbance occurs if the range of points overlaps with another adjustment. If none exists, the method 1100 returns to block 1104 and prepares to mark the next landmark. When a previous correction is shifted, the method 1100 readjusts all linked pairs until each error (that is, the largest displacement) is less than an iteration error criterion $E_i$ (block 1114) before the method 1100 returns to block 1104.

The methods and techniques described herein may be implemented in a combination of digital electronic circuitry and software (or firmware) residing in a programmable processor (for example, a special-purpose processor or a general-purpose processor in a computer). An apparatus embodying these techniques may include appropriate input and output devices, a programmable processor, and a storage medium tangibly embodying program instructions for execution by the programmable processor. A process embodying these techniques may be performed by a programmable processor executing a program of instructions that operates on input data and generates appropriate output data. The techniques may be implemented in one or more programs that are executable on a programmable system including at least one programmable processor coupled to receive data and instructions from (and to transmit data and instructions to) a data storage system, at least one input device, and at least one output device. Generally, a processor will receive instructions and data from at least one of a read only memory (ROM) and a random access memory (RAM).

Storage media suitable for tangibly embodying computer program instructions and data include all forms of non-volatile memory, and include by way of example, semiconductor memory devices; ROM and flash memory devices; magnetic disks such as internal hard disks and removable disks; magneto-optical disks; optical disks such as compact disks (CDs), digital video disks (DVDs), and other computer-readable media. Any of the foregoing may be supplemented by, or incorporated in, specially-designed application-specific integrated circuits (ASICs). When information is transferred or provided over a network or another communications connection (either hardwired, wireless, or a combination of hardwired or wireless) to a computer, the computer properly views the connection as a computer-readable medium. Thus, any such combinations of connections are included within the scope of computer-readable media.

This description has been presented for purposes of illustration, and is not intended to be exhaustive or limited to the embodiments disclosed. Variations and modifications may occur, which fall within the scope of the following claims.

What is claimed is:

1. A navigation device, comprising:
   a sensor module operable to provide position estimates based on magnetic field strength measurements;
   a processing unit configured to record the magnetic field strength measured by the sensor module of an area substantially surrounding a user of the navigation device, the processing unit further configured to measure a track crossing based on a comparison of a magnetic field strength at a current position and at one or more previous position estimates, and for each measured track crossing, align the current position with the one or more previous position estimates and adjust an accumulation of measurement error below an error threshold based on the one or more previous position estimates; and
   wherein the processing unit corrects any intervening positions and error estimates between the current position and the one or more previous position estimates.

2. The navigation device of claim 1, wherein the processing unit automatically recognizes the measured track crossings by correlating the magnetic field strength and a heading between the current position and the one or more previous position estimates.

3. The navigation device of claim 2, wherein the processing unit is configured to qualify the current position based on a plurality of correlation threshold criteria for the sensor module.

4. The navigation device of claim 1, wherein the sensor module is configured to:
   on a first channel, continually measure heading data within the area comprising the magnetic field substantially surrounding the user of the navigation device in at least three orientations; and
   on a second channel, provide the position estimates to the processing unit, wherein the position estimates are iteratively adjusted based on the error threshold.

5. The navigation device of claim 1, wherein at least a portion of the navigation device comprises a dead reckoning module, the dead reckoning module operable to provide at least heading data within a sensor measurement range.

6. The navigation device of claim 1, wherein the processing unit further comprises a memory block, the memory block operable to record at least each of the recognized track crossings.

7. The navigation device of claim 1, wherein the sensor module further comprises:
   at least one gyroscope; and
   a barometric altimeter.

8. The navigation device of claim 1 and further comprising:
   an output interface; and
   an output terminal communicatively coupled to the navigation unit through the output interface, the output terminal operable to provide the current position and the previous position estimation data to the user of the navigation device.

9. The navigation device of claim 1, and further comprising:
   an attachment interface communicatively coupled to the processing unit, the attachment interface configured to receive navigation input data; and
   a global positioning system (GPS) receiver in operative communication with the processing unit.

10. The navigation device of claim 1, wherein the navigation device is a personal navigation system.

11. The navigation device of claim 1, wherein the sensor module is further operable to provide position estimates based on at least one of a heading, range data, or sonar data.

* * * * *